United States Patent
Krishnan et al.

(10) Patent No.: US 7,722,790 B2
(45) Date of Patent: May 25, 2010

(54) ANAMORPHIC MICROLENS ARRAY

(75) Inventors: Chari Krishnan, Fairport, NY (US);
Charles W. Lander, Wayland, NY (US);
Ronald J. Sudol, Rochester, NY (US);
Jin-Shan Wang, Pittsford, NY (US);
Charles M. Rankin, Jr., Penfield, NY (US); Paul D. Yacobucci, Rochester, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 397 days.

(21) Appl. No.: 11/763,307

(22) Filed: Jun. 14, 2007

(65) Prior Publication Data
US 2008/0278663 A1 Nov. 13, 2008

Related U.S. Application Data

(63) Continuation-in-part of application No. 11/803,092, filed on May 11, 2007, now abandoned.

(51) Int. Cl.
*B29C 33/40* (2006.01)
*G02B 27/10* (2006.01)
*G03C 1/00* (2006.01)

(52) U.S. Cl. .............. 264/219; 359/619; 430/273.1
(58) Field of Classification Search ......... 359/619–626, 359/443, 454–455; 430/320–321, 945, 273.1; 264/1.1, 1.32, 2.7, 1.6, 219; 428/98
See application file for complete search history.

(56) References Cited

U.S. PATENT DOCUMENTS

| | | | |
|---|---|---|---|
| 6,075,863 A | 6/2000 | Krishnan et al. | |
| 6,700,702 B2 | 3/2004 | Sales | |
| 7,092,165 B2 * | 8/2006 | Morris et al. | 359/626 |
| 7,092,166 B1 | 8/2006 | Wood | |
| 2005/0146795 A1 * | 7/2005 | Gretton et al. | 359/626 |
| 2006/0239629 A1 | 10/2006 | Qi et al. | |

* cited by examiner

*Primary Examiner*—Scott J Sugarman
*Assistant Examiner*—Dawayne A Pinkney
(74) *Attorney, Agent, or Firm*—Edwin Oh

(57) ABSTRACT

An LC display comprises in order (a) a light source, (b) a transparent polymeric film bearing on the light exit surface of the film an array of close-packed convex microlenses having a distribution of sizes and oriented in one direction, whereby the light output is preferentially spread in a desired direction, and (c) an LC panel. A related process and film are also disclosed.

16 Claims, 7 Drawing Sheets

ANAMORPHIC MICROLENS ARRAY

CROSS-REFERENCE TO RELATED APPLICATION

This application is a Continuation-in-Part of U.S. Ser. No. 11/803,092 filed May 11, 2007 now abandoned entitled "ANAMORPHIC MICROLENS ARRAY" the content of which is incorporated herein by reference.

FIELD OF THE INVENTION

This invention relates to an anamorphic microlens array film and a process for making the film that may be used, for example, in conjunction with a backlight unit in a liquid crystal display (LCD) device.

BACKGROUND OF THE INVENTION

Anamorphic microlens arrays are arrays of elliptical or asymmetric shaped microlenses that provide selectively broader divergence of light in any one of two orthogonal directions. Their use as asymmetric diffusers in the backlights of LCD devices in televisions, notebooks, monitors and cell phones might lead to more efficient use of the available light. For example, US 2006/0239629 discusses backlight configurations for LCD devices with an asymmetric top diffuser. Light from a linear light source is transmitted through a light guide panel and outputted through a front face to a prismatic film. The prismatic film then redirects the light in a direction that is more normal to the LCD. An asymmetric diffuser is applied between the prismatic film and the LCD panel and aligned with respect to the prismatic film such that it spreads light more in a second direction than the first. The prismatic film may be a standard prismatic film such as a brightness enhancement film or a reversed prismatic film. The asymmetric diffuser may be a separate sheet disposed between the reversed prismatic film and the LCD panel or it may be laminated or produced directly on the smooth side of the prismatic film. US 2006/0239629 indicates that the asymmetric diffuser may be a holographic diffuser or may be prepared by a coating technique but does not go into details of the fabrication process. Furthermore, US 2006/0239629 does not teach the use of an anamorphic microlens array as an asymmetric diffuser.

U.S. Pat. No. 7,092,166 describes the use of anamorphic microlens arrays in projection screens to provide greater divergence in the horizontal than in the vertical viewing direction. It is indicated that improvements in the light intensity distribution may be obtained by having a mixed population of two different microlens elements in the array. However, no details are provided as to how such an array is to be fabricated. Furthermore, U.S. Pat. No. 7,092,166 does not teach the use of the microlens array in an LCD backlight unit.

U.S. Pat. No. 6,700,702 also describes the use of anamorphic microlens arrays in projection screens. It is indicated that a random close-packed array of microlenses is desirable for avoiding undesirable diffraction effects such as Moiré effects. It is also indicated that a typical size for the microlenses is between 20 and 120 micrometers. However, once again, no details are provided as to how the microlens array is to be fabricated. Furthermore, U.S. Pat. No. 6,700,702 does not teach the use of the microlens array in an LCD backlight unit. The placement of the anamorphic microlens array in an LCD backlight unit is very different from that in a projection display. In an LCD backlight unit, the anamorphic microlens array is placed between the light source and the LCD panel whereas in a projection display the anamorphic microlens array is part of a projection screen that is placed between an image forming panel and the viewer.

U.S. Pat. No. 6,675,863 describes a method for fabricating asymmetric diffusers. A coating of photosensitive medium is first applied to a substrate and cured. The cured photosensitive medium is subjected to an optical exposure to create the desired pattern and the exposed photosensitive medium is then developed. An elastomer formulation is applied on the developed photosensitive medium and cured to create an elastomer master. The pattern on the elastomer master is then transferred to a metal roller to produce seamless diffuser films on plastic substrates. Clearly, this is a complex process requiring a very large number of steps. Furthermore, because of the relatively slow reaction of the photosensitive medium to light and the physical separation that is required between the light source and the photosensitive medium during recording, the process is extremely sensitive to vibration and movement.

U.S. Pat. No. 5,932,342 also describes a method for fabricating asymmetric diffusers. A dispersion of optically clear ellipsoidal particles in an optically clear medium is formed into a film by extrusion or casting. The ellipsoidal particles are aligned during the extrusion or casting process to provide asymmetric diffusers. The approach provides a volumetric diffuser wherein the ellipsoidal particles are embedded within the volume of the optically clear medium. It is preferable to have a surface diffuser wherein the diffusing elements are present only on the surface of the diffuser film in order to maximize light transmission through the diffuser film.

US 2005/0058947 describes a method for fabricating optical microstructures such as microlenses by rotating a cylindrical platform that includes a radiation sensitive layer. The optical microstructures that are imaged in the radiation sensitive layer may be developed to provide a master for replicating microlenses. The approach is similar to that described in U.S. Pat. No. 6,675,863 and suffers from the disadvantages noted above. A simple method for fabricating an optical sheet suitable for use in LCD backlight units and projection screens containing on one side a close-packed random array of anamorphic microlenses is still needed.

U.S. patent application Ser. No. 11/561,244 filed Nov. 17, 2006 describes a simple low-cost process for fabricating relatively large area microlens arrays comprising close-packed hemispherical shaped microlenses. The process involves casting a solution of an organic soluble polymer in a volatile water-immiscible organic solvent having specific gravity greater than that of water on a suitable surface, exposing the cast solution to a humid environment and condensing water droplets on the cast solution, evaporating off the solvent and condensed water droplets from the cast composition to create a first structured film with hemispherical micro-cavities, coating a second fluid polymer composition over the first structured polymer film, curing the second fluid polymer film while it is still in contact with the first structured polymer film to render it solid and create a transparent second structured film comprising a first flat side and a second side with an array of microlenses formed thereon corresponding to the hemispherical micro-cavities of the first structured film and separating the second structured film with the microlens array from the first structured film. Although this process is relatively simple to implement, it does not provide a film containing anamorphic or asymmetric shaped microlenses. In spite of the foregoing efforts, there remains a need for new anamorphic microlens array films and methods of making such a film.

SUMMARY OF THE INVENTION

The invention provides an LC display comprising in order (a) a light source, (b) a transparent polymeric film bearing on the light exit surface of the film an array of close-packed convex elliptical anamorphic microlenses having a distribution of sizes and oriented in one direction, whereby the light output is preferentially spread in a desired direction, and (c) an LC panel. A process for making such a display is also provided.

The invention also provides a process for making a hydrophobic surfaced mold comprising:

(a) providing a copolymer of a hydrophobic and hydrophilic portion;

(b) forming a first microstructured film with concave features on the upper surface of the copolymer by solvent evaporation, water condensation, and drying to form a hydrophilic top surface;

(c) annealing the first microstructured film to modify the top surface of the film to a more hydrophobic surface;

whereby the top surface exhibits improved nonstick properties and can be used as a mold having low surface energy.

Further, the invention provides a shaped article comprising a hydrophobic upper surface bearing concave features wherein the surface layer contains (1) block polymeric material that is preferentially oriented with its hydrophobic portion upward and its hydrophilic portion downward or (2) blends of hydrophobic and hydrophilic polymers or copolymers.

Also, the invention provides an LC display comprising in order (a) a light source, (b) a transparent polymeric film bearing on the light exit surface of the film an array of close-packed convex elliptical anamorphic microlenses having a distribution of sizes and oriented in one direction, whereby the light output is preferentially spread in a desired direction, wherein the transparent polymeric film has an elastic modulus of at least 1,000 kPa, and (c) an LC panel.

The invention provides new anamorphic microlens array films and methods of making such a film.

DETAILED DESCRIPTION OF THE INVENTION

Figure 1:
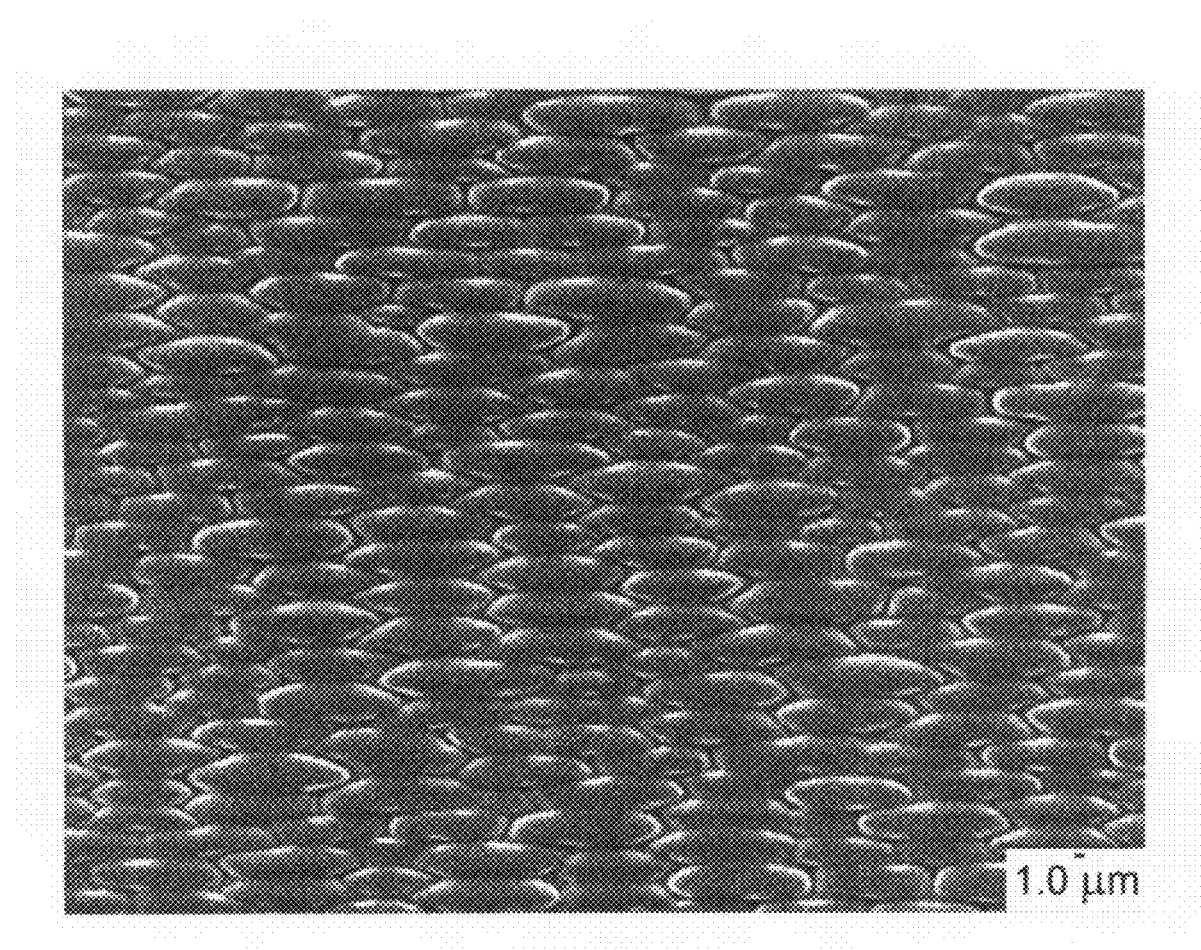
FIG. 1 is a scanning electron micrograph of a micro-lens array in an embodiment of the invention.

The invention is summarized above.

The inventors have determined that a close-packed array of anamorphic microlenses may be quite easily prepared by heating the above first structured film to a temperature above the glass transition temperature of the polymer composing the film, stretching the film to create micro-cavities of the desired asymmetric shape and then cooling the film below the glass transition temperature while the film is maintained in the stretched configuration to lock in the asymmetric shape of the micro-cavities. A second fluid polymer composition is then coated over the film containing the asymmetric shaped microcavities and cured in contact with it to render it solid to create a second structured film comprising a flat side and a second side with an array of anamorphic microlenses on the surface that is then separated from the first structured film.

"Anamorphic" refers to a feature producing different magnification of an image in each of two perpendicular directions. "Convex" refers to a feature curved like the exterior of a sphere, ellipse or other curved object.

Microlens arrays as employed in the present invention may be formed by forming a solution of an organic soluble polymer with defined surface energy and wetting properties along with a fluorocarbon surfactant in a volatile water-immiscible organic solvent having density greater than that of water, casting this solution in a humid environment, evaporating off the solvent and condensed water droplets from the cast composition to create a first structured polymer film with hemispherical surface cavities, heating the first structured film to a temperature above the glass transition temperature of the polymer composing the film, stretching the film to create micro-cavities of the desired asymmetric shape, cooling the film below the glass transition temperature while the film is maintained in the stretched configuration to lock in the asymmetric shape of the micro-cavities, coating a second fluid polymer composition over the first structured polymer film with asymmetric micro-cavities, curing the second fluid polymer composition while it is still in contact with the first structured polymer film to render it solid and create a transparent second structured film comprising a first flat side and a second side with an array of anamorphic or elliptical microlenses formed thereon corresponding to the asymmetric shaped cavities of the first structured film, wherein the solid material of the second structured film has a certain surface energy and refractive index, and separating the second structured film with the anamorphic or elliptical micro-lens array from the first structured polymer film. The resulting anamorphic microlens array may then be used in a backlight unit to form an LCD device in accordance with the invention.

In an embodiment of the invention, suitable materials for the organic soluble polymer include polyethylene, polypropylene, polystyrene, polyacrylate, polyvinylchloride, cellulose acetate, polysulfone, polycarbonate, polycaprolactone, polymethylmethacrylate, polybutylmethacrylate, polyamide, polyisoprene, polyisobutylene, polyurethane and cellulose acetate butyrate. Mixtures of these polymers may also be used. It is preferred that the surface energy of the organic soluble polymer is greater than 30 dynes/cm and more suitably greater than 35 dynes/cm. Furthermore, it is preferred that the contact angle that a drop of water makes with the surface of the polymer is between 50 and 90 degrees and more suitably between 60 and 80 degrees. The weight average molecular weight of the organic soluble polymer is suitably in the range of 20,000 to 500,000.

The organic soluble polymer is suitably a thermo-softening polymer. Examples of thermo-softening polymers include polyethylene, polyurethane, polyvinylchloride, polystyrene and polymethylmethacrylate. Thermo-softening polymers are rigid or glassy at low temperatures and rubbery at high temperatures. The transition from glassy to rubbery behavior occurs at a certain temperature known as the glass transition temperature (Tg). The Young's modulus of the polymer decreases drastically from about $10^9$ to $10^{10}$ Pascals to below $10^7$ Pascals when the polymer is heated above the glass transition temperature. The Young's modulus is a ratio of the tensile stress to strain and is a measure of the rigidity or the resistance of the polymer to stretching. In other words, the higher the value of the Young's modulus, the greater the resistance to stretching. The glass transition temperature of the polymer of the invention is suitably above room temperature, more suitably above 50° C. and most suitably above 90° C.

In accordance with the method of the invention, the organic soluble polymer is used in conjunction with a fluorocarbon surfactant. Fluorocarbon surfactants are a class of surfactants wherein the hydrophobic part of the amphiphile comprises at least in part some portion of a carbon-based linear or cyclic moiety having fluorines attached to the carbon where typically hydrogens would be attached to the carbons together with a hydrophilic head group. Some typical non-limiting fluorocarbon surfactants include fluorinated alkyl polyoxy-alkylene and fluorinated alkyl esters as well as ionic surfactants. Representative structures for these compounds are given below:

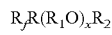 (I)

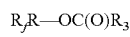 (II)

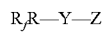 (III)

 (IV)

wherein $R_f$ contains from 6 to about 18 carbons each having from about 0 to about 3 fluorines attached. R is either an alkyl or alkylene oxide group which when present, has from about 1 to about 10 carbons and $R_1$ represents an alkylene radical having from about 1 to 4 carbons. $R_2$ is either a hydrogen or a small alkyl capping group having from 1 to about 3 carbons. $R_3$ represents a hydrocarbon moiety comprising from about 2 to 22 carbons including the carbon on the ester group. This hydrocarbon can be linear, branched or cyclic saturated or unsaturated and may contain moieties based on oxygen, nitrogen and sulfur including, but not limited to ethers, alcohols, esters, carboxylates, amides, amines, thio-esters, and thiols; these oxygen, nitrogen and sulfur moieties can either interrupt the hydrocarbon chain or be pendant on the hydrocarbon chain. In the third structure above, Y represents a hydrocarbon group that can be an alkyl, pyridine group, amidopropyl, etc. that acts as a linking group between the fluorinated chain and the hydrophilic head group. In the third and fourth structures, Z represents a cationic, anionic and amphoteric hydrophilic head group including but not limited to carboxylates, sulfates, sulfonates, quaternary ammonium groups and betaines. Non-limiting commercially available examples of these structures include Zonyl 9075, FSO, FSN, FS-300, FS-310, FSN-100, FSO-100, FTS and TBC from DuPont and Fluorad surfactants FC430, FC431, FC-740, FC-99, FC-120, FC-754, FC-170C and FC-171 from 3M in St. Paul, Minn.

Suitable solvents for the organic soluble polymer and the fluorocarbon surfactant are halogen based organic solvents such as chloroform, dichloromethane and dichloroethane; aromatic hydrocarbons such as benzene, toluene and xylene; esters such as ethyl acetate and butyl acetate; water insoluble ketones such as methyl isobutyl ketone; and carbon disulfide. The organic solvents may be used alone or in the form of a mixed solvent comprising a combination of two or more. In accordance with the method of the invention, to form hemispherical cavities only on the surface of the first structured film, the organic solvent has a specific gravity greater than 1.0 and more suitably greater than 1.2. Also, it is preferred that the boiling point of the organic solvent is less than 120° C. at normal atmospheric pressure and more suitably less than 100° C. Furthermore, the latent heat of evaporation of the organic solvent is desirably greater than 200 kJ/kg and more desirably greater than 300 kJ/kg. It is also desired that the solubility of the organic solvent in water at room temperature is less than 5 g/100 mL and more suitably less than 2 g/100 mL.

The concentration of the organic soluble polymer in the organic solvent is suitably between 5 wt % and 40 wt % and the concentration of the fluorocarbon surfactant is most suitably less than 1.0 wt % based on the weight of the organic soluble polymer, preferably from 0.05 to 0.5 wt % and more preferably 0.05 to 0.2 wt % based on the concentration of polymer.

The cast solution of the organic soluble polymer and the fluorocarbon surfactant in the organic solvent is most suitably exposed to humid air in a humidity chamber where the relative humidity is controlled between 40 and 95%. After evaporation of the organic solvent and the condensed water droplets, the resulting hemispherical surface cavity structured polymer film preferably has a surface fluorine content between 2 and 20 atom % and more suitably between 3 and 10 atom %.

The use of a fluorocarbon surfactant, along with other material selections and process conditions in accordance with the above descriptions, has been found to be particularly effective for enabling formation of a first structured film having a high fill factor (greater than 80%, preferably greater than 85%) of relatively small (less than 20 micrometer, preferably 1-10 micrometer) hemispherical shaped cavities (having a mean cavity depth to diameter ratio of greater than 0.30, preferably greater than 0.35 and most preferably greater than 0.40).

In an embodiment of the invention, the first structured polymer film with hemispherical surface cavities is heated above the glass transition temperature of the polymer to reduce the Young's modulus of the polymer sufficiently to stretch the sheet of film preferentially in one of two orthogonal directions and modify the shape of the hemispherical surface cavities to an elliptical or asymmetric form. The film may be suitably stretched to 1.5 times the original linear dimension and more suitably to 2 times the original linear dimension. After stretched polymer film is cooled below the glass transition temperature, it is maintained in the stretched configuration in order to lock in or 'freeze' the shape of the surface cavities in the modified elliptical or asymmetric form.

The second fluid polymer composition, used to form the microlens array film itself, is preferably an elastomer such as polydimethylsiloxane (PDMS) that may be cured after it has been spread over the first structured polymer film. A suitable material is Sylgard 184 from Dow Corning Corporation that is thermally cured. Alternatively, a PDMS composition that is cured by ultra violet (UV) radiation may be used. Other elastomers such as trimethylsiloxy terminated methylhydrosiloxane-dimethylsiloxane or methylhydrosiloxane-dimethylsiloxane or (methacryloxypropyl)methylsiloxane-dimethylsiloxane copolymers that are commercially available as VDT-731, HMS-301 and RMS-033 from Gelest, Inc. may also be used. Also suitable are photocurable perfluoropolyethers (PFPEs). It is desirable that the cured polymer material of the second structured film micro-lens array has surface energy less than 30 dynes/cm and more suitably less than 25 dynes/cm to enable it to be easily released from the first structured polymer film by peeling off and creation of a microlens array with individual lenses closely conforming to the tightly packed arrangement of the cavities of the first structured film employed as a mold. It is also desired that the surface properties of the micro-lens array material is such that a drop of water placed on it will have a contact angle in excess of 90 degrees. Furthermore, it is desired that the refractive index of the micro-lens array material is between 1.25 and 1.75 and more suitably between 1.4 and 1.65.

The described method enables formation of a second structured film having a first flat side and a second side having a high fill factor (greater than 80%, preferably greater than 85%) of relatively small (less than 50 micrometer maximum linear dimension) elliptically shaped microlenses corresponding to the cavities formed in the first structured film mold. The elliptically shaped microlens elements suitably have an aspect ratio (ratio of length to width) greater than 1.2, more suitably greater than 1.5 and most suitably greater than 2. Furthermore, the dimensions of the population of elliptically shaped microlenses (length and width) in the second structured film suitably exhibit a Gaussian distribution with a mean length greater than 5 micrometers, more suitably greater than 8 micrometers and most suitably greater than 12 micrometers. The micro-lenses are close-packed but randomly distributed in the plane of the sheet. A random distribution of micro-lenses is most suitable for avoiding undesirable optical artifacts such as Moiré effects. The height of the microlenses is suitably between 0.1 and 10 µm, more suitably between 0.5 and 5 µm and most suitably between 1 and 4 µm.

The LC display comprises in order a light source, a transparent polymeric film bearing on the light exit surface of the film an array of close-packed convex elliptical microlenses and an LC panel.

The light source is suitably a cold cathode fluorescent tube (CCFL), a hot cathode fluorescent tube, a light-emitting diode (LED) or combinations of these. The LED may be a white LED, a colored LED or combinations of colored LEDs.

The transparent polymeric film is suitably an elastomer such as polydimethylsiloxane (PDMS). A suitable material is Sylgard 184 from Dow Corning Corporation that is thermally cured. Alternatively, a PDMS composition that is cured by ultra violet (UV) radiation may be used. Other elastomers such as trimethylsiloxy terminated methylhydrosiloxane-dimethylsiloxane or methylhydrosiloxane-dimethylsiloxane or (methacryloxypropyl)methylsiloxane-dimethylsiloxane copolymers that are commercially available as VDT-731, HMS-301 and RMS-033 from Gelest, Inc. may also be used. Also suitable are photocurable perfluoropolyethers (PFPEs). It is desirable that the refractive index of the microlens array material is between 1.25 and 1.75 and more suitably between 1.4 and 1.65.

The transparent polymeric film has a first flat side and a second side having a high fill factor (greater than 80%, preferably greater than 85%) of relatively small (less than 50 micrometer maximum linear dimension) elliptically shaped microlenses. The elliptically shaped microlens elements suitably have an aspect ratio (ratio of length to width) greater than 1.2, more suitably greater than 1.5 and most suitably greater than 2. Furthermore, the dimensions of the population of elliptically shaped microlenses (length and width) suitably exhibit a Gaussian distribution with a mean length greater than 5 micrometers, more suitably greater than 8 micrometers and most suitably greater than 12 micrometers. The microlenses are close-packed but randomly distributed in the plane of the sheet. A random distribution of micro-lenses is most suitable for avoiding undesirable optical artifacts such as Moiré effects. The height of the microlenses is suitably between 0.1 and 10 µm, more suitably between 0.5 and 5 µm and most suitably between 1 and 4 µm.

In a further embodiment of the invention, suitable materials for the organic soluble polymer used for preparing the first structured polymer film are copolymers or polymer blends comprising a mixture of a hydrophilic (and high surface energy) component and a hydrophobic (and low surface energy) component. The surface energy of the hydrophilic (and high surface energy component) is suitably greater than 30 dynes/cm and more suitably greater than 35 dynes/cm. The contact angle that a drop of water makes with the surface of the hydrophilic component is suitably between 50 and 90 degrees and more suitably between 60 and 80 degrees. The surface energy of the hydrophobic (and low surface energy) component is suitably less than 30 dynes/cm and more suitably less than 25 dynes/cm to allow a second structured polymer film to be easily released from it by peeling off and enable the creation of a microlens array with individual lenses closely conforming to the tightly packed arrangement of the cavities of the first structured film employed as a mold. It is also desired that the surface properties of the hydrophobic component is such that a drop of water placed on it will have a contact angle in excess of 90 degrees.

Suitable materials for the organic soluble polymer are copolymers wherein one of the components of the copolymer is a hydrophilic segment such as polystyrene, polyester, polyethyleneterephthalate (PET), polyvinylchloride (PVC), polycarbonate, polyimide, polysulfone, polyethersulfone, bisphenol A polycarbonate (BPAC) or nylon and the second component is a hydrophobic segment such as polydimethylsiloxane (PDMS) or a fluorinated material such as fluorinated ethylene propylene or polyvinylfluoride. The copolymers may be either random or block copolymers such as di-block or tri-block copolymers. Particularly suitable are copolymers containing polystyrene and PDMS or copolymers containing bisphenol A polycarbonate (BPAC) and PDMS. Each PDMS block in the copolymer suitably contains between 2 and 40 repeat units of dimethylsiloxane and more suitably between 15 and 25 units of dimethylsiloxane. The proportion of PDMS in the copolymer is suitably between 0.5 mol % and 20 mol % and more suitably between 1 mol % and 10 mol %. The average molecular weight of the copolymer is suitably in the range of 20,000 to 500,000.

Also suitable as materials for the organic soluble polymer are blends of a hydrophilic polymer such as polystyrene, polyester, polyethyleneterephthalate (PET), polyvinylchloride (PVC), polycarbonate, polyimide, polysulfone, polyethersulfone, bisphenol A polycarbonate (BPAC) or nylon and a hydrophobic polymer such as polydimethylsiloxane (PDMS) or a fluorinated material such as fluorinated ethylene propylene or polyvinylfluoride. Most suitable are blends of polystyrene and PDMS or polycarbonate and PDMS. The proportion of PDMS in the blend is suitably between 0.5 mol % and 20 mol % and more suitably between 1 mol % and 10 mol %

The organic soluble polymer is suitably used in conjunction with a fluorocarbon surfactant.

The cast solution of the organic soluble polymer and the fluorocarbon surfactant in a volatile organic solvent are most suitably exposed to humid air in a humidity chamber where the relative humidity is controlled between 40 and 95%. In the presence of humidity, the hydrophilic component of the copolymer or polymer blend preferentially locates to the surface. After evaporation of the organic solvent and the condensed water droplets, a first structured polymer film is formed with concave features and a hydrophilic top surface.

The first structured polymer film may be annealed in air by heating to a temperature close to or above the Tg of the major component of the copolymer or polymer blend. Upon annealing in dry air, the lower surface energy hydrophobic component preferentially migrates to the surface to modify the top surface of the first structured film to a hydrophobic surface. The first structured film may also be stretched after heating to modify the shape of the cavities to an elliptical or asymmetric form. The film may be maintained in the stretched configuration and cooled below the glass transition temperature to lock in or 'freeze' the surface cavities in the modified elliptical or asymmetric form. A film with both asymmetric shaped cavities and hydrophobic surface is obtained in this manner. The hydrophobic top surface exhibits improved nonstick properties and can be used as a mold having low surface energy.

Where PDMS and BPAC are employed as hdropobic and hydrophilic components, respectively, the degree of hydrophobicity may be expressed as an atomic ratio of Si/C at the surface where the ratio is 0.5 maximum for all PDMS at the surface ($Si(CH_3)_2$) and maximum hydrophobicity and the ratio is 0.0 for no silicon at the surface.

A second fluid polymer composition may be coated over the mold, cured and released to form the microlens array. The hydrophobic top surface of the mold allows a variety of hydrophilic (and high surface energy) materials to be easily released from it. Suitable materials for the second fluid polymer composition are ultraviolet (UV) curable materials such as UV curable acrylates urethanes and urethane acrylate oligomers. Examples of such materials are NOA 68 and NOA 72 from Norland Products Inc., AC PR-153, AC PR-155, AC PR-157 and AC PR-157-S5 from Addison Clear Wave and CN 968 from the Sartomer Company Inc. Particularly suitable are fluid polymer compositions that after curing and release result in a second structured film having a refractive index greater than 1.45, an elastic modulus greater than 1000 kPa and optical transmission greater than 80%. More desirable are fluid polymer compositions that after curing and release result in a second structured film having a refractive index greater than 1.5, an elastic modulus greater than 10,000 kPa and optical transmission greater than 85%. Most desirable are fluid polymer compositions that after curing and release result in a second structured film having refractive index greater than 1.5, an elastic modulus greater than 100,000 kPa and optical transmission greater than 90%.

In a still further embodiment of the invention, a first structured polymer film may be prepared using a hydrophilic polymer such as polycarbonate or polystyrene as described previously. After stretching at high temperature to modify the shape of the cavities, the surface properties of the film may be modified by treating with suitable reagents such as oxygen plasma and a fluorinated organosilane material to make the surface hydrophobic and provide the necessary non-stick properties. A second fluid polymer composition may then be cast over this first structured film and cured to create a second structured polymer film of a material that is hydrophilic and of high surface energy. An example of a suitable organosilane material is (tridecafluoro-1,1,2,2-tetrahydrooctyl)-1-trichlorosilane from United Chemical Technologies, Inc.

The transparent polymer film may be advantageously used with other films for light re-direction or light management in an LC display such as brightness enhancement films, light extraction films or diffuser films.

The LC display may further comprise an LC panel. The LC panel comprises cells containing liquid crystalline material. An external voltage or field may be used to selectively rotate the axes of the liquid crystal molecules. As is well known, by application of a voltage across the LC panel, the direction of LC molecules can be controlled and the state of polarization of the transmitted light may be selectively changed. As such, by selectively switching of the transistors in the array, the LC medium can be used to modulate light with image information. Often, this modulation provides dark state light at certain picture elements (pixels) and bright-state or attenuated light at others, where the polarization state governs the state of the light. Thereby, an image is created on a screen by the selective polarization transformation by the LC panel and optics to form the image or 'picture'.

Example 1

This example illustrates a method of preparation of an anamorphic or light shaping diffuser in accordance with an embodiment of the invention.

Figure 2:
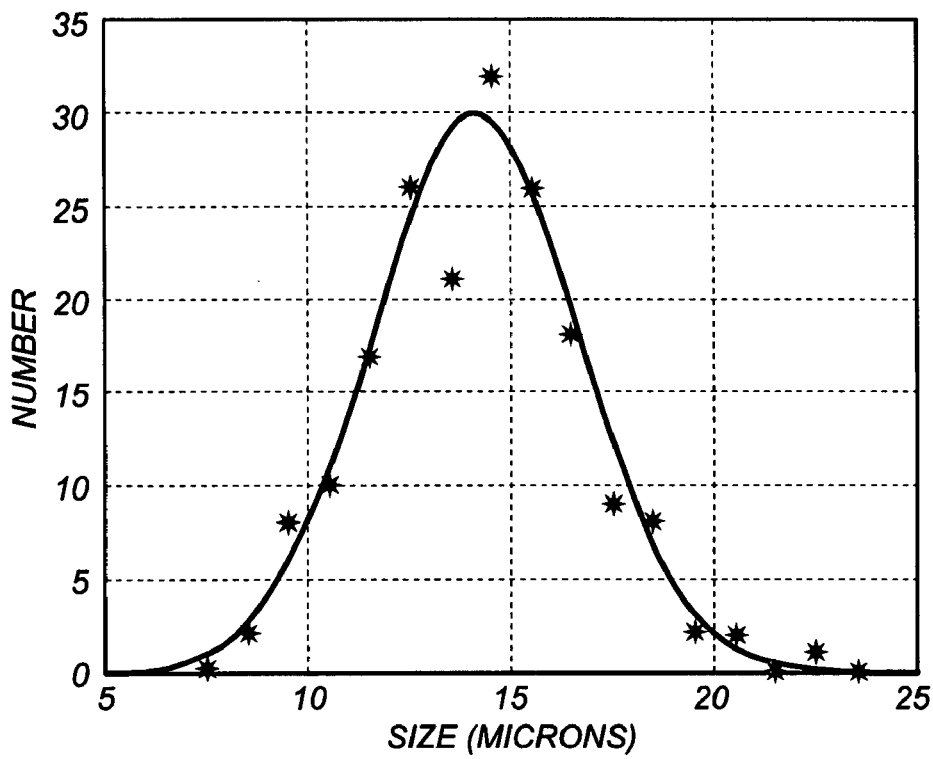
FIG. 2 is a diagram showing the distribution of lengthwise dimensions of the elliptical microlenses in an embodiment of the invention.
Figure 3:
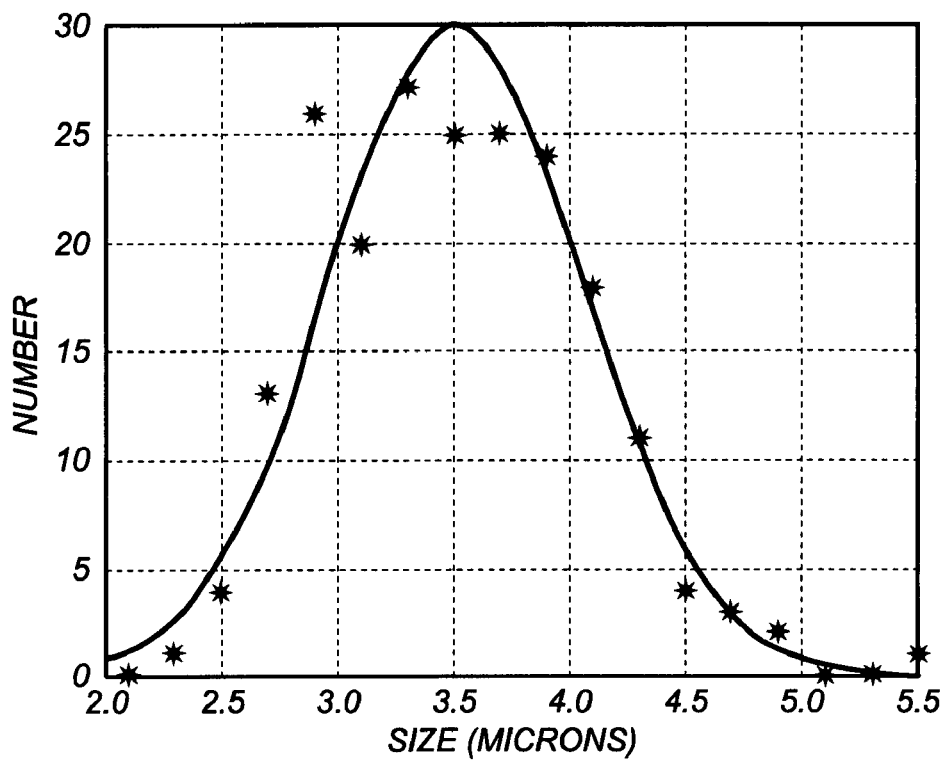
FIG. 3 is a diagram showing the distribution of widthwise dimensions of the elliptical microlenses in an embodiment of the invention.

A solution containing 18.0 wt % polystyrene (350,000 molecular weight from Aldrich) and 0.1% FC431 fluorocarbon surfactant (based on the weight of polystyrene) in methylene chloride was applied on the surface of a sheet of polyethyleneterephthalate (PET) at a wet thickness of 0.76 mm. The wet coating was then immediately inserted into a closed chamber where the temperature and humidity were controlled at 22° C. and 86% RH and kept there for 5 minutes. After evaporation of the organic solvent, the sheet was kept in the chamber for an additional 5 minutes and the chamber was purged with nitrogen gas to remove residual water. The resulting dried polymer film was peeled off the PET substrate. The dried film was structured with closely packed hemispherical cavities. The micro-voided film was mounted on a device for uniaxial stretching housed in a heated environment where the temperature was maintained at 140° C. (above the glass transition temperature (Tg) of the film). The film was stretched at a rate of 2 mm/min until the cavities or micro-voids were modified to the desired elongated shape. The stretched film was constrained (to maintain the shape of the elongated micro-voids or cavities) and cooled to 22° C. (below the Tg of the film) to permanently preserve the features. Sylgard 184 elastomer base (from Dow Corning Corporation) was combined with Sylgard curing agent (also from Dow Corning) in a 10:1 weight ratio. The mixture was applied to the surface of the micro-voided film at a wet thickness of 0.2 mm. The elastomer was then cured in contact with the mold by heating to 100° C. for one hour. The cured elastomer was then cooled to 22° C. and peeled off the mold to obtain a positive replica of the features that had been created in the polystyrene mold. FIG. 1 shows a scanning electron micrograph of the resulting anamorphic (light shaping) diffuser. The diffuser comprises randomly close-packed elliptical shaped elements with an average lengthwise dimension close to 14 micrometers and an average widthwise dimension close to 3.5 micrometers. FIGS. 2 and 3 show that the distributions of lengthwise and widthwise dimensions of microlenses in the array exhibit close to Gaussian distributions with standard deviations of 2.5 and 0.55 respectively.

A control isotropic diffuser film was prepared in the same manner as above except that the micro-voided film was not stretched prior to application of the mixture comprising the Sylgard 184 base and curing agent. This film comprised a close-packed array of hemispherical microlenses with an average diameter close to 5.6 micrometers. The optical performance of the control film was characterized along with the anamorphic diffuser film.

Figure 4:
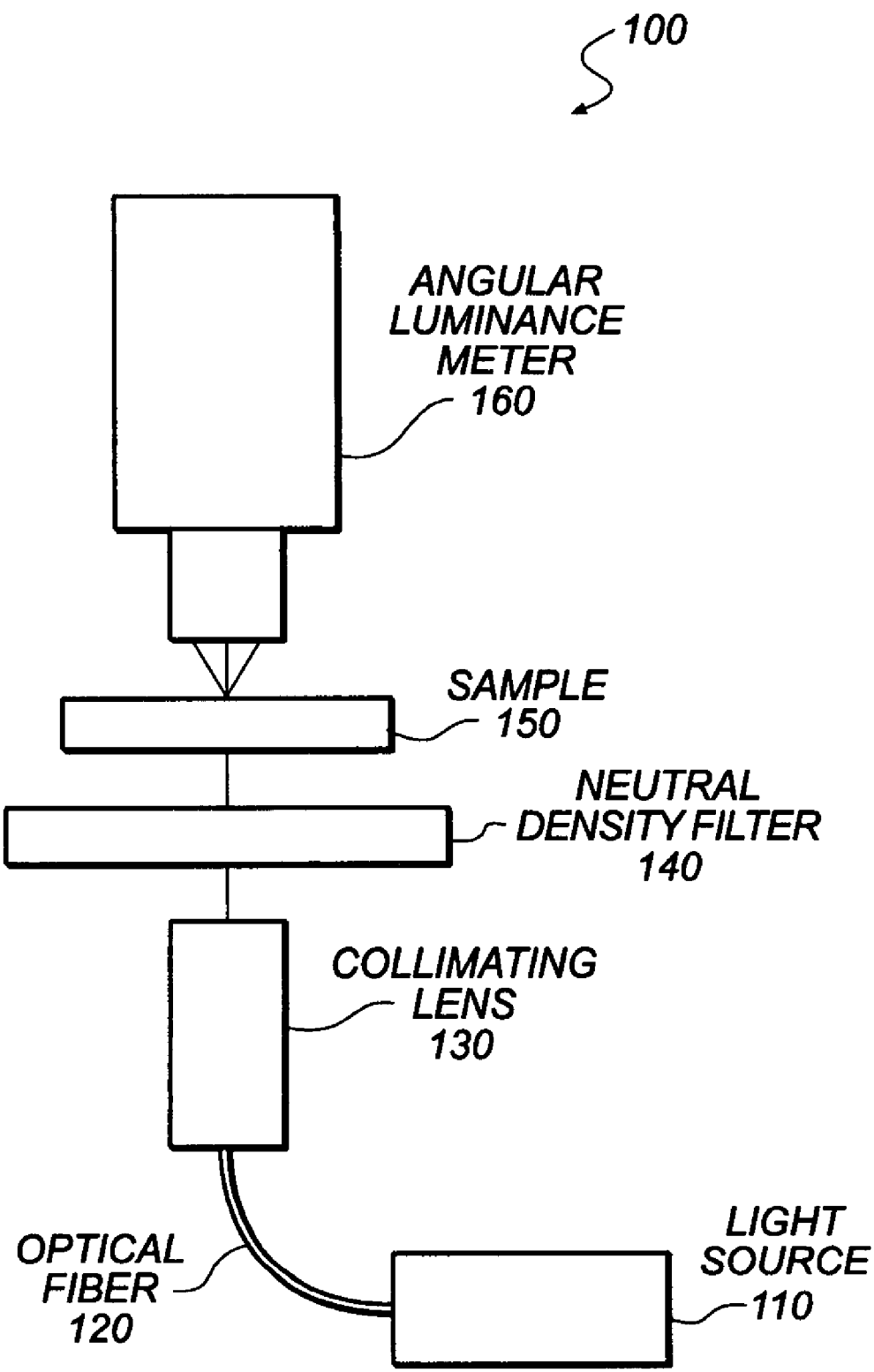
FIG. 4 is a diagram of the experimental set-up used to characterize the optical performance of the microlenses in an embodiment of the invention.

FIG. 4 is a schematic of the set-up 100 used to characterize optical performance. Light from a light source 110 was coupled onto an optical fiber 120. This light, in turn, was coupled out of the fiber by a collimating lens 130. The arrangement provided a highly directional beam onto the elliptical microlens array sheet sample 150. A neutral density filter 140 was interposed between the collimating lens and the sample 150 to control the amount of light entering the angular luminance meter 160 in order to avoid detector saturation. The light redirected by the sample was collected by the angular luminance meter that displays luminance as a function of azimuthal and polar angle in an iso-luminance plot.

Figure 5:
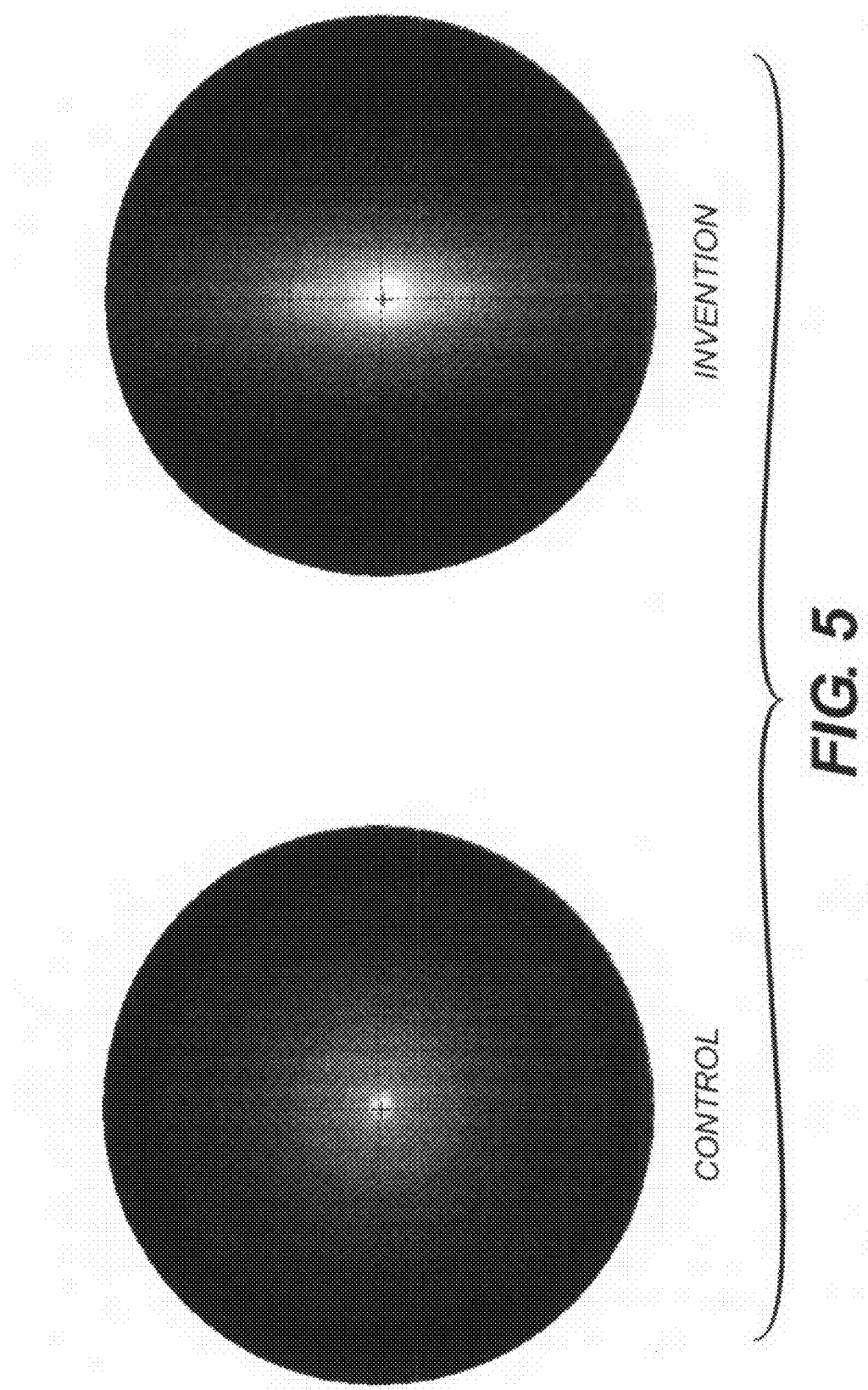
FIG. 5 are images illustrating the output of light as a function of viewing angle using a microlens array in accordance with an embodiment of the invention and a comparison microlens array

FIG. 5 shows iso-luminance plots for the anamorphic diffuser and the control isotropic diffuser. It is clear that the control diffuser spreads the incident collimated light uniformly whereas the anamorphic diffuser of the invention is able to control the distribution of light, providing greater spread in a given viewing direction.

Example 2

Figure 6:
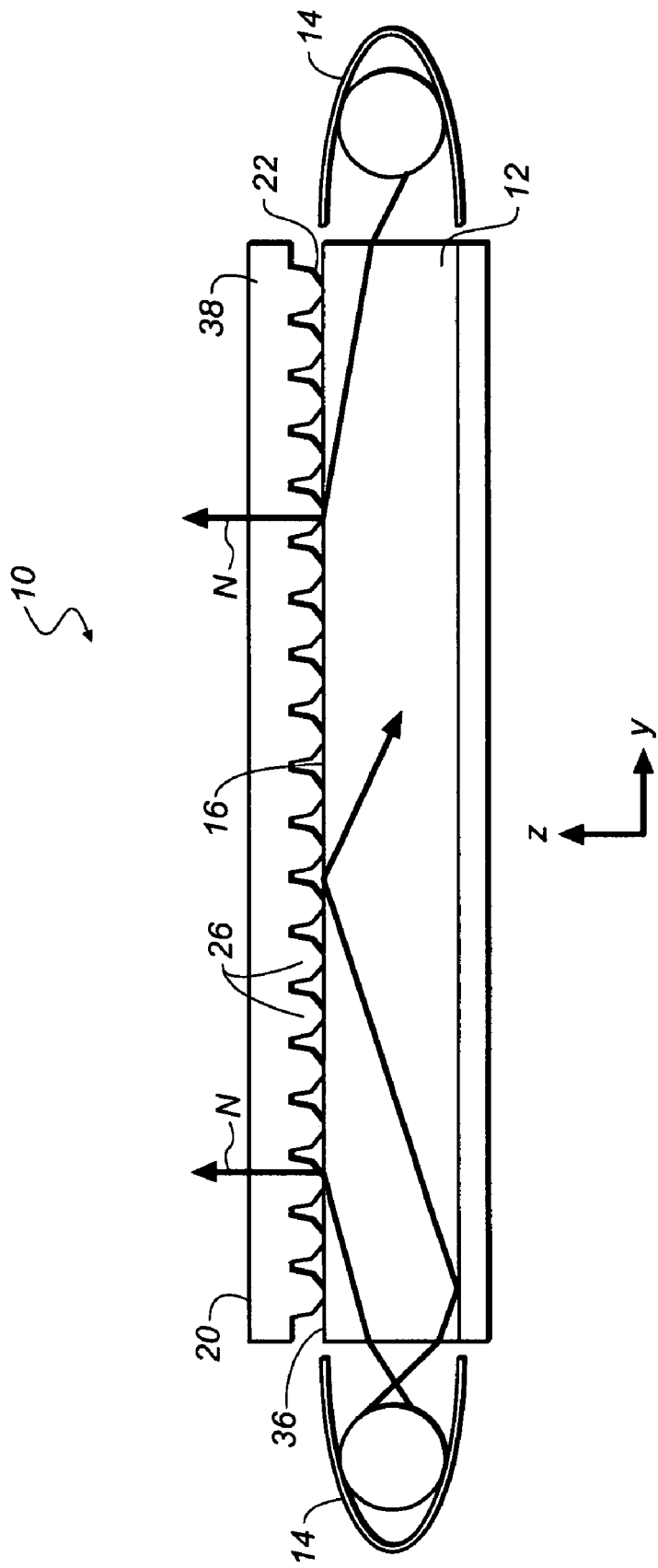
FIG. 6 is a diagram of a light extraction film and illumination apparatus suitable for use with a microlens array in an embodiment of the invention.

This example illustrates the performance of a multi-functional LCD backlight unit comprising the anamorphic diffuser of the invention in combination with a light extraction film and illumination apparatus. A cross-sectional view of a light extraction film and illumination apparatus 10 suitable for use with the anamorphic diffuser of the invention is shown in FIG. 6 and is more fully described in U.S. patent application Ser. No. 11/388,582. The light extracting film 20 is optically coupled to the top surface 16 of a light guide 12 using a layer of optical adhesive 36. Light sources 14, typically cold-cathode fluorescent lights (CCFLs) or light-emitting diodes (LEDs) or some other emissive source, provide source illumination to light guide 12, which guides light using Total Internal Reflection (TIR). Light extracting film 20 obtains this light at an optical input surface 22 and directs this light toward an output surface at suitable angles for various lighting and display applications. Light extracting film 20 has a plurality of features 26 projecting from a film substrate 38 to form input surface 22 and optically coupled with light guide 12 to obtain and direct the light from light guide 12

Figure 7:
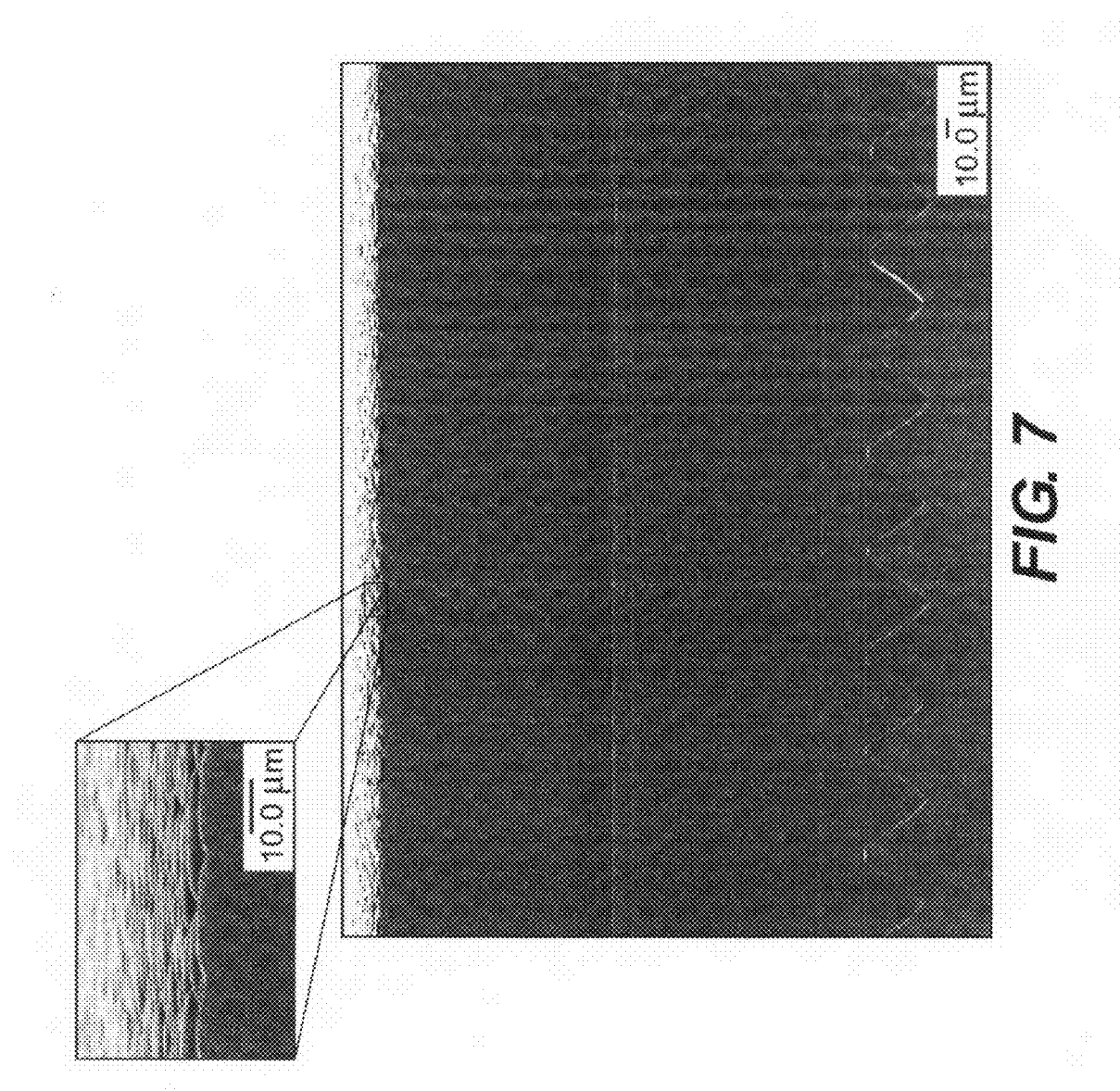
FIG. 7 is an image of a multifunctional film in an embodiment of the invention comprising a microlens array with elliptical shaped microlenses prepared in accordance with an embodiment of the invention attached to a light extraction film. Also shown is an enlarged view with details of the microlens array.

Multifunctional films comprising an anamorphic diffuser (prepared according to the procedure described in example 1) and the light extraction film were prepared by laminating the anamorphic diffuser to the light extraction film 20 in two different orientations. A first multifunctional film was prepared by laminating the diffuser such that the elongated structures of the diffuser were oriented parallel to the elongated structures of the light extraction film and the illuminating light source. A second multifunctional film was prepared by laminating the diffuser such that the elongated structures of the diffuser were oriented perpendicular to the elongated structures of the light extraction film and the illuminating light source. FIG. 7 shows a cross-sectional view of the second multifunctional film. It is clear that the elongated structures of the diffuser reside completely on the surface of the film. The light output from LCD backlight units with the multifunctional films was compared to the light output from an LCD backlight unit with only the light extraction film (without the anamorphic diffuser of the invention).

Figure 8:
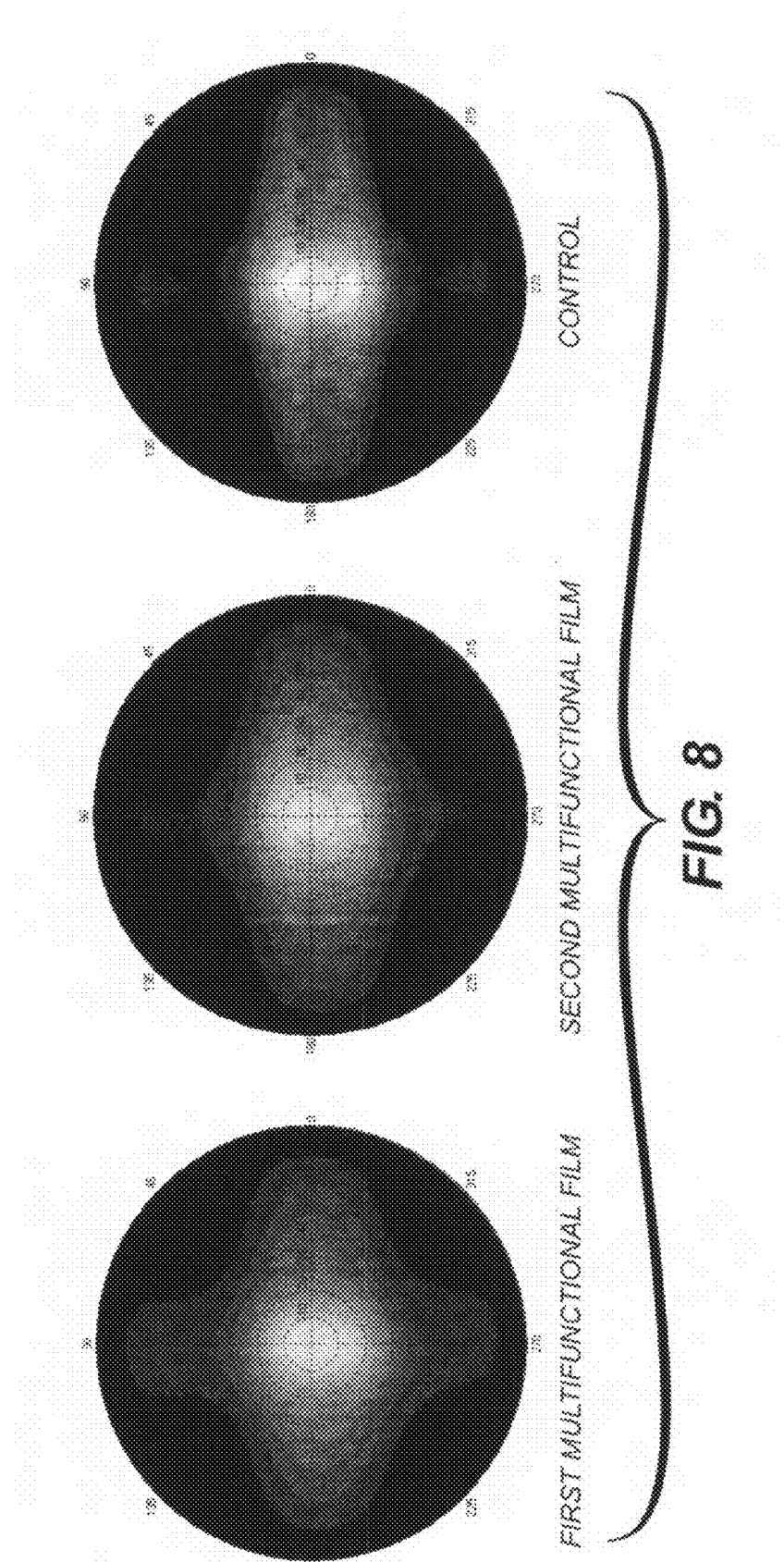
FIG. 8 are images showing light output as a function of viewing angle for a first multifunctional film in an embodiment of the invention, a second multifunctional film in an embodiment of the invention and a comparison light extraction film without the elliptical microlens array of the invention.

FIG. 8 shows a set of iso-luminance plots representing the output light distribution of backlight units comprising the first and second multifunctional films and a control backlight unit comprising only the light extraction film. It is clear that selective changes in the output light distribution in either the vertical or horizontal viewing direction may be effectively made based on the orientation of the anamorphic diffuser of the invention.

Example 3

This example illustrates a method of preparation of an anamorphic or asymmetric light shaping diffuser in accordance with another embodiment of the invention.

A solution containing 20 wt % of a copolymer of bisphenol A polycarbonate (BPAC) and polydimethylsiloxane (PDMS) (49.5 mol % bisphenol A, 50 mol % polycarbonate and 1 mol % PDMS; average molecular weight of 92,000 and 31 repeat units of dimethylsiloxane in each PDMS block) and 0.1% FC431 fluorocarbon surfactant (based on the weight of polymer) in methylene chloride was applied on the surface of a sheet of PET at a wet coverage of 710 $cm^3/m^2$. The wet coating was then immediately inserted into a closed chamber where the temperature and humidity were controlled at 24° C. and 65% RH and kept there for 5 minutes. This led to condensation and self-assembly of water droplets on the surface of the sheet. After evaporation of the organic solvent, the sheet was kept in the chamber for an additional 5 minutes and the chamber was purged with nitrogen gas to dry the remove residual water. The dried polymer film was peeled off the PET substrate. The film was structured with closely packed hemispherical cavities. The micro-voided film was mounted on a device for uniaxial stretching housed in a heated environment at 2% RH for 25 minutes where the temperature was maintained at 130° C. The film was stretched at a rate of 2 mm/min until the cavities or micro-voids were modified to the desired elongated shape. The stretched film was constrained (to maintain the shape of the micro-voids or cavities) and cooled to 22° C. to permanently preserve the features. A UV curable polyurethane material NOA 68 was then applied to the surface of the micro-voided film at a wet coverage of 237 $cm^3/m^2$ and subsequently cured using UV radiation of 1.0 joule/$cm^2$. The hydrophilic cured material (water contact angle of 70 degrees) was easily peeled off the mold to provide an asymmetric microlens array of relatively high refractive index (1.54) and elastic modulus (138,000 kPa).

Example 4

A first structured polymer film was prepared in the same manner as described in example 3. This film was then cut into four smaller pieces. The pieces were then annealed in a heated environment maintained at 120° C. for different lengths of time. The composition of the surfaces of these films (to a depth of about 35 angstroms from the top) was then measured by X-ray photoelectron spectroscopy (XPS). The table below shows the ratio of the atomic percent silicon to the atomic percent carbon in the surface region as a function of annealing. A higher ratio of silicon to carbon indicates a greater fraction of PDMS in the surface region.

| Sample treatment | Silicon/Carbon |
| --- | --- |
| Not annealed | 0.26 |
| 10 min at 120 C. | 0.30 |
| 20 min | 0.31 |
| 30 min | 0.32 |

It is clear that annealing at high temperature results in an increase in the fraction of PDMS at the surface providing the desired non-stick hydrophobic properties.

Example 5

A first structured polymer film was prepared in the same manner as in example 3 but was not heated after preparation. A UV curable polyurethane material NOA 68 was then applied to the surface of this micro-voided film in the same manner as in example 3 and cured. It was found that the cured second structured film could not be separated from the first structured film by peeling off indicating that the surface of the first structured film in this case did not have the desired non-stick properties.

The entire contents of the patents and other publications referred to in this specification are incorporated herein by reference. The invention has been described in detail with particular reference to certain preferred embodiments thereof, but it will be understood that variations and modifications can be effected within the spirit and scope of the invention.

PARTS LIST

10 Light extraction film and illumination apparatus
12 Light guide
14 CCFL light source
16 Top surface of light guide
20 Light extracting film
22 Input surface of light extracting film
26 Features of light extracting film
36 Optical adhesive layer
38 Film substrate
100 Set up used to characterize optical performance microlens arrays
110 Light source for analyzing elliptical microlens array
120 Optical fiber
130 Collimating lens
140 Neutral density filter
150 Microlens array sample
160 Angular luminance meter

The invention claimed is:

1. A process for making a transparent polymeric film bearing on the light exit surface of the film an array of close-packed convex elliptical microlenses having a distribution of sizes and oriented in one direction comprising the steps of
    (a) providing a first structured polymeric film with hemispherical micro-cavities
    (b) heating the first structured polymeric film to a temperature above the glass transition temperature (Tg) of the polymer composing the film;
    (c) stretching the first structured polymeric film to form micro-cavities of the desired asymmetric shape;
    (d) cooling the first structured polymeric film below Tg while the film is maintained in the stretched configuration to lock in the asymmetric shape of the micro-cavities;
    (e) coating a curable second fluid polymer composition over the first structured polymeric film to form a second polymeric film; and
    (f) curing the second polymer film while it is still in contact with the first structured polymeric film to render it solid and create a transparent second polymeric structured film comprising a first typically flat side and a second side with an array of microlenses formed thereon corresponding to the asymmetric shaped micro-cavities of the first structured film and separating the second structured polymeric film with the microlens array from the first structured polymeric film.

2. The process of claim 1 wherein the Tg of the first structured polymeric film is at least 50° C.

3. The process of claim 1 wherein the Tg of the first structured polymeric film is at least 70° C.

4. The process of claim 1 wherein the Tg of the first structured polymeric film is at least 90° C.

5. The process of claim 1 wherein curing is accomplished is thermally- or photo-cured.

6. The process of claim 1 wherein the first structured polymeric film with hemispherical micro-cavities is obtained by the steps of:
    (a) casting a solution of an organic soluble polymer in a volatile water immiscible organic solvent having specific gravity greater than 1 on a suitable surface;
    (b) exposing the cast solution to a humid environment and condensing water droplets on the cast solution; and
    (c) evaporating off the solvent and condensed water droplets from the cast composition to create the first structured polymeric film with hemispherical micro-cavities.

7. The process of claim 6 wherein the surface energy of the organic soluble polymer composing the first structured polymeric film is greater than 30 dynes/cm.

8. The process of claim 6 wherein the surface energy of the organic soluble polymer is greater than 35 dynes/cm.

9. The process of claim 6 wherein the weight average molecular weight of the organic soluble polymer is in the range of 20,000 to 500,000.

10. The process of claim 6 wherein the contact angle between a drop of water and the surface of the organic soluble polymer is between 50 and 90 degrees.

11. The process of claim 6 wherein the contact angle between a drop of water and the surface of the organic soluble polymer is between 60 and 80 degrees.

12. The process of claim 1 wherein Young's Modulus of the first structured polymeric film decreases to below $10^7$ Pa when the polymer is heated above Tg.

13. The process of claim 1 wherein Young's Modulus of the first structured polymeric film is between $10^9$ and $10^{10}$ Pa when the polymer is below Tg.

14. The process of claim 6 wherein the solution of organic soluble polymer further contains a fluorocarbon surfactant.

15. The process of claim 6 wherein the boiling point of the water immiscible organic solvent is less than 120° C. at normal atmospheric pressure.

16. The process of claim 6 wherein the organic solvent used with the organic soluble polymer comprises one selected from the group consisting of halogen based organic solvents, aromatic solvents, water insoluble ketone solvents, and carbon disulfide.

* * * * *